(12) United States Patent
Burcham et al.

(10) Patent No.: US 10,959,041 B1
(45) Date of Patent: Mar. 23, 2021

(54) TRAFFIC ANALYSIS OF MOBILE PHONES PARTITIONED BY GEOHASH

(71) Applicant: Sprint Communications Company L.P., Overland Park, KS (US)

(72) Inventors: Robert H. Burcham, Overland Park, KS (US); Matthew Habiger, Kansas City, KS (US); Adam C. Pickett, Prairie Village, KS (US)

(73) Assignee: Sprint Communications Company L.P., Overland Park, KS (US)

(*) Notice: Subject to any disclaimer, the term of this patent is extended or adjusted under 35 U.S.C. 154(b) by 85 days.

(21) Appl. No.: 16/439,691

(22) Filed: Jun. 12, 2019

(51) Int. Cl.
*H04W 4/021* (2018.01)
*H04W 4/029* (2018.01)
*H04W 64/00* (2009.01)
*G06F 16/29* (2019.01)

(52) U.S. Cl.
CPC ......... *H04W 4/021* (2013.01); *G06F 16/29* (2019.01); *H04W 4/029* (2018.02); *H04W 64/003* (2013.01)

(58) Field of Classification Search
CPC ... H04W 4/021; H04W 4/029; H04W 64/003; G06F 416/29
USPC ..................................................... 455/456.1
See application file for complete search history.

(56) References Cited

U.S. PATENT DOCUMENTS

| 10,694,321 | B1* | 6/2020 | Burcham | H04W 4/021 |
| 2014/0173520 | A1* | 6/2014 | Sheha | G06Q 30/02 |
| | | | | 715/834 |
| 2015/0019294 | A1* | 1/2015 | Milton | G06Q 30/0205 |
| | | | | 705/7.34 |
| 2015/0149091 | A1* | 5/2015 | Milton | H04W 4/029 |
| | | | | 702/2 |
| 2016/0371390 | A1* | 12/2016 | Nair | G06Q 30/0277 |
| 2017/0286534 | A1* | 10/2017 | Arora | G06F 16/29 |

* cited by examiner

*Primary Examiner* — Congvan Tran (57) ABSTRACT

A method of building a statistical survey of locations of mobile communication devices partitioned by geohashes. The method comprises accessing event data items from a data store, wherein each item of event data is created by a mobile communication device, based on the identities of cell sites associated with the items of event data, creating a plurality of location fixes of the mobile communication devices, wherein each of the created location fixes comprises a location determined based on a location of the identified cell site and a time stamp based on a time stamp of an associated item of event data, analyzing each of the location fixes by determining a first geohash that contains the location fix, determining counts of location fixes in each of a plurality of geohashes, and storing each count associated with a geohash in a data store, wherein each count is indexed by its associated geohash.

20 Claims, 6 Drawing Sheets

TRAFFIC ANALYSIS OF MOBILE PHONES PARTITIONED BY GEOHASH

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Geolocations of mobile communication devices can serve as proxies for geolocations of human beings. By determining the geolocation of mobile communication devices at specific times, storing this time-associated geolocation data in a data store, and analyzing the geolocation data, a variety of useful information can be generated. For example, a rate of human beings traversing an area at specific times of day and days of the week can be inferred. A speed of human beings (e.g., the cars which the human beings are driving or riding in) traversing an area can be inferred.

SUMMARY

In an embodiment, a method of building a statistical survey of locations of mobile communication devices partitioned by geohashes is disclosed. The method comprises accessing a plurality of event data items from a data store by an application executing on a computer system, wherein each item of event data is created by a mobile communication device and the event data comprises a time stamp and an identity of a cell site used by the mobile communication device to transmit the event data to a wireless communication network and, based on the identities of the cell sites associated with the items of event data, creating a plurality of location fixes of the mobile communication devices by the application, wherein each of the created location fixes comprises a location determined based on a location of the identified cell site and a time stamp based on the time stamp of an associated item of event data. The method further comprises eliminating location fix duplicates of each mobile communication device by the application, wherein a location fix duplicate is a location fix that has a location within a predefined distance of a retained location fix of the mobile communication device and has a time stamp within a predefined time interval of the retained location fix of the mobile communication device, counting the number of location fixes of each mobile communication device after eliminating location fix duplicates by the application, and, for each mobile communication device having a number of location fixes that exceeds a predefined threshold, reducing the number of location fixes of the mobile communication device by the application by randomly eliminating location fixes of the mobile communication device. The method further comprises adjusting the time stamp of at least some of the retained location fixes associated with eliminated location fixes by the application based at least in part on the time stamp of the eliminated location fix, analyzing each of the location fixes retained after eliminating duplicates and after reducing excess numbers of location fixes above the predefined threshold by the application by determining a geohash that contains the location fix, determining counts of location fixes in each of a plurality of geohashes by the application, and storing each count associated with a geohash in a data store by the application, wherein each count is indexed by its associated geohash.

In another embodiment, a system for building a statistical survey of locations of mobile communication devices partitioned by geohashes is disclosed. The system comprises a processor, a first data store, a second data store, a non-transitory memory, and an application stored in the non-transitory memory. The first data store comprises a plurality of event data entries, wherein each event data entry comprises a time stamp and an identity of a cell site used by a mobile communication device to transmit the event data to a wireless communication network. The second data store comprises statistics of locations of mobile communication devices, wherein each entry in the second data store is indexed by a geohash. The application, when executed by the processor, accesses a plurality of event data entries from the first data store and creates a plurality of location fixes of the mobile communication devices associated with the event data entries, wherein each of the created location fixes is created based on the time stamp and the location of the identified cell site contained in one of the event data entries. The application further eliminates location fix duplicates of each mobile communication device, wherein a location fix duplicate is a location fix that has a location within a predefined distance of a retained location fix of the mobile communication device and has a time stamp within a predefined time interval of the retained location fix of the mobile communication device. The application further, for each of the location fixes retained after eliminating duplicates, determines a geohash containing the location associated with the location fix, determines statistics of locations of mobile communication devices partitioned by geohash, and stores the statistics indexed by geohash in the second data store.

In yet another embodiment, a method of building a statistical survey of locations of mobile communication devices partitioned by geohashes. The method comprises accessing a plurality of event data items from a data store by an application executing on a computer system, wherein each item of event data is created by a mobile communication device and the event data comprises a time stamp and an identity of a cell site used by the mobile communication device to transmit the event data to a wireless communication network and, based on the identities of the cell sites associated with the items of event data, creating a plurality of location fixes of the mobile communication devices by the application, wherein each of the created location fixes comprises a location determined based on a location of the identified cell site and a time stamp based on the time stamp of an associated item of event data. The method further comprises for each of the location fixes determining a first geohash with a first geohash format that contains the location fix and determining a second geohash with a second geohash format that contains the location fix by the application, wherein the first geohash format comprises a different number of digits than the second geohash format and determining counts of location fixes in each of a plurality of geohashes with the first geohash format by the application. The method further comprises determining counts of location fixes in each of a plurality of geohashes with the second geohash format, determining statistics of locations of mobile communication devices in geohashes with the first geohash format and in geohashes with the second geohash format, and storing the counts indexed by geohashes and the statistics indexed by geohashes in a data store.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Geolocation data pertaining to mobile communication devices can be collected by wireless communication service providers and analyzed to derive valuable information on the presence, dwell times, and movements of human beings. This information can be used to plan and adapt highway systems, construction plans, and business plans. This information can be used to establish values and prices for presenting content on billboards and on digital screens outside of the home. It is observed that in such analysis, the geolocation of the mobile communication device serves as a proxy for the geolocation of the human being.

The present disclosure teaches analyzing geolocation data pertaining to mobile communication devices to identity a geohash in which each item of data is located, determining statistics on these geolocations, and storing these statistics indexed by the associated geohash. When the geolocation data has been processed and stored in this way, the geolocation data can be easily and quickly looked up and used by authorized application users. For example, a business interested in knowing a volume of people in an area being considered as a prospective lunch restaurant construction can specify an address of the proposed restaurant, an application programming interface (API) of the application can map the address to a geohash, the relevant statistics can be looked up based on the geohash, and the statistics can be presented via a workstation to the business person.

The geolocation data can be analyzed retrospectively to provide history going back as far as geolocation data exists. In an embodiment, the geolocation data is analyzed periodically and during low processing demand time periods, for example in early morning hours. The geolocation data, for example, may be analyzed once per month by the application executing in a batch processing mode of operation. Once the analysis of geolocation data has been completed, the data can be retrieved and used indefinitely into the future. Said in other words, a user does not need to first specify their region of interest and then have access to statistics relevant to that region going forwards; a user can specify their region of interest—for example a street address—and then have access to last month's analysis, last year's analysis, or analysis from three years ago.

The geolocation data can be collected incidentally, for example incidental to the event of a mobile communication device establishing an attachment to a different serving cell site (e.g., as the device travels from the serving area of a first cell site to the serving area of a second cell site) or incidental to the event of the device originating or terminating a voice call. It is a benefit of collecting this incidental information that it avoids the expenses of actively polling the device to report its location, for example by burdening the device to periodically report its GPS coordinates. Notwithstanding, the geolocation data can include GPS coordinates reported by the device, for example harvesting GPS coordinates of the device that are shared pursuant to obtaining location based services.

In a different approach (i.e., different from the approach of the present disclosure) to determining and analyzing human traffic data more computationally intensive algorithms may be relied upon. For example, in another approach, geolocation data may be analyzed to infer routes traveled by devices (and the human beings associated with the devices). Then, further analysis may be performed to determine if this route intersects a predefined area of interest (e.g., a "point of interest") such as a proximity to a billboard or proximity to a coffee shop. This other approach entails a heavier processing burden in performing the analysis. Points between data points are synthesized to complete the routes (e.g., to "connect the dots"). Then the maze of different routes of different mobile communication devices must be compared with the many points-of-interest to determine which routes intersect and which routes do not intersect with each point-of-interest. Additionally, this approach may require users of the information to predefine their point-of-interest, which can itself present a barrier of entry or a barrier to use. By contrast, as discussed further below, the access to the information and statistics generated by this system can be accessed simply by specifying an address of interest—a very minimal burden of gaining access to the desired information.

It has been determined that little additional information about the geolocation and movements of a user of a mobile communication device is gained if geolocation data points of the subject mobile communication device in excess of this maximum number (e.g., a predefined threshold number) are analyzed. It is a teaching of the present disclosure, therefore, that the geolocation data points associated with each mobile communication device are culled by the application, before it performs statistical analysis of geolocation data points, to reduce their number to a predefined maximum number. In an embodiment, geolocation data points are culled to reduce them to a maximum of 2,000 geolocation data points per analysis interval, for example per month. If a different analysis time interval is used for the periodic analysis, the threshold number of analyzed geolocation data points may be adapted accordingly (a shorter analysis time interval would be associated with a smaller maximum number of geolocation data points analyzed, a longer analysis time interval would be associated with a larger maximum number of geolocation data points). This culling step can be said to increase the processing efficiency of this application by avoiding processing additional geolocation data points that contribute little to the desired understanding of human traffic patterns.

It is a teaching of the disclosure that the geolocation data points that are culled and removed from analysis may be selected intelligently so as to reduce the impact on the representation of human traffic that is produced. The culling may be performed in two steps. A first step may selectively remove or cull one of two geolocation data points that are deemed to occupy substantially the same time and substantially the same place. For example, two geolocation data points that are separated by 5 seconds of time and are located within 50 feet of each other (or even located at the same putative location) may be selected for culling one geolocation data point and retaining the other. In this case, it is thought little information is lost: the remaining geolocation data point stands in for both data points. A second step may selectively remove or cull geolocation data points that are located within the same geohash region, for example a highest resolution geohash region. In an embodiment, the geohash data points that are retained may have their timestamps selectively adapted to better reflect a dwell time of the mobile communication device within a geohash. For example, if 5 geolocation data points associated with a device are located within the same 7 digit geohash, 3 of the 5 geolocation data points may be culled. If the first geolocation data point in the geohash is culled, the second geolocation data point in the geohash may have its timestamp adapted to have the timestamp value of the culled first geohash data point. Thus, the second geolocation data point stands in for the first geolocation data point for the purpose of representing the start of a dwell time of the device within the geohash region. If the fifth and last geolocation data point of the device in the geohash is culled, the fourth geolocation data point in the geohash may have its timestamp adapted to have the timestamp value of the culled fifth geohash data point. Thus, the fourth geolocation data point stands in for the fifth geolocation data point for the purpose of representing the end of a dwell time of the device within the geohash region. In this way, the selective culling of geolocation data points can reduce the processing burden—increase the processing efficiency—without losing corresponding fidelity in representation of the dwell time of the device within the geohash region.

Geohashes identify geolocations by a scalar number. It is a property of geohashes that the more digits used to specify a geohash, the more precise is the designation of the associated geolocation (e.g., the smaller the region identified by the subject geohash). For example, a five digit geohash may identify a 2 kilometer by 4 kilometer rectangle, while a 6 digit geohash may identify a ½ kilometer by 1 kilometer rectangle. It is another property of geohashes that arithmetically proximate geohash values designate geolocations that are physically proximate to each other. In an embodiment geohashes may be expressed with digits expressed in base 32 representation.

The present disclosure teaches analyzing the geolocation data at multiple different fidelity levels or levels of precision, for example by identifying which 5 digit geohash a geolocation falls into, which 6 digit geohash the geolocation falls into, and which 7 digit geohash the geolocation falls into. The application analyzes the statistics of mobile communication device geolocation data at each of the levels of geohash precision and stores the statistics accordingly. Thus, if a user looks up statistics for device traffic in a 7 digit geohash looked up based on a specific address, the statistics may pertain to traffic in an area of about ¼ kilometer by ⅛ kilometer area. If the user looks up statistics for device traffic in a 6 digit geohash looked up based on the same specific address (e.g., the region designated by the 6 digit geohash contains within it the region designated by the 7 digit geohash—as well as other regions having 7 digit geohashes proximate to the 7 digit geohash associated with the given specific address), the statistics may pertain to traffic in an area of about ½ kilometer by 1 kilometer area. If the user looks up statistics for device traffic in a 5 digit geohash looked up based on the same specific address, the statistics may pertain to traffic in an area of about 2 kilometers by 4 kilometers.

The determination of some of the traffic statistics can advantageously be determined for the geohashes with fewer digits by summing and processing the statistics of geohashes with more digits, thereby avoiding processing the same geolocation data twice and thereby saving processing time and hence increasing computational efficiency. One statistical parameter may need to be recalculated at each level of geohash precisions—the raw count of mobile communication devices in the subject region designated by a geohash. At the same time, even in this determination some efficiency is gained—reprocessing may be avoided—because once it has been determined by analysis that a geolocation data point is located in a specific 7 digit geohash region, it can be determined by direct look-up (data base look-up, data structure look-up) what in which 6 digit geohash region the same geolocation data point is located and in which 5 digit geohash region the same geolocation data point is located.

In an embodiment, to promote more efficient processing, the application performs analysis using different geohash precisions in different regions. For example, in a dense urban region, a first set of geohash precisions may be used for analysis (e.g., 7 digit geohashes, 6 digit geohashes, and 5 digit geohashes); in a suburban metropolitan region, a second set of geohash precisions may be used for analysis (e.g., 6 digit geohashes, 5 digit geohashes, and 4 digit geohashes); and in a rural region, a third set of geohash precisions may be used for analysis (e.g., 5 digit geohashes, 4 digit geohashes, and 3 digit geohashes). This adaptation of geohash precision may be configured into the application. Alternatively, the application may dynamically adapt geohash precision based on a count of geolocation data points within regions.

Figure 1:
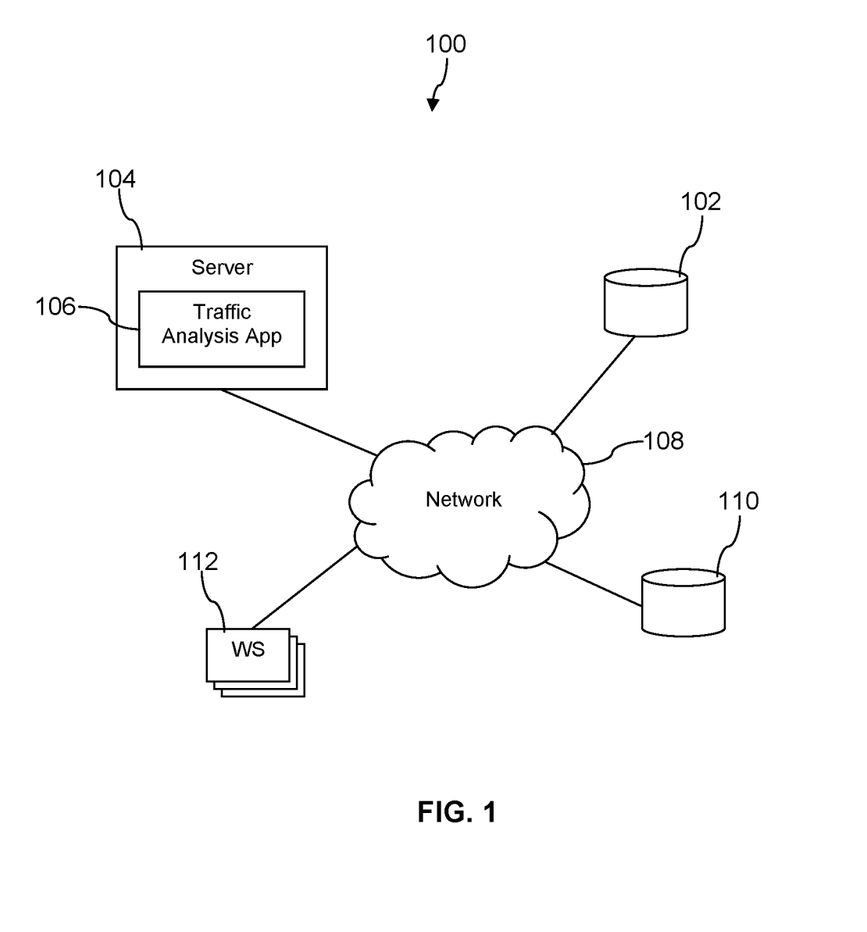
FIG. 1 is a block diagram of a system according to an embodiment of the disclosure.

Turning now to FIG. 1, a system 100 is described. In an embodiment, the system 100 comprises a first data store 102 comprising geolocation data associated with mobile communication devices, a server computer 104 executing a traffic analysis application 106, a network 108, a second data store 110 comprising traffic statistics indexed by geohash values, and a plurality of workstations 112. The network 108 comprises one or more public networks, one or more private networks, or a combination thereof.

The geolocation data stored in the first data store 102 may be generated by the traffic analysis application 106 that analyzes event data items generated by wireless communication cell sites in response to observing communication events and stored in the first data store 102. Each event data item identifies a mobile communication device, a cell site, and a timestamp of the event. The traffic analysis application 106 can derive mobile communication device geolocation data items from these event data items by using a location of the cell site identified in an event data item (e.g., the traffic analysis application 106 may use the identity of the cell site to index into a list or table of cell site locations to look up the location of the cell sites) as a proxy for the location of the mobile communication device and associating the identity of the mobile communication device, the proxy location of the cell site, and the timestamp together in a new location data point entry to be stored in the first data store 102.

For example, if a mobile communication device originates a phone call, the serving cell site may generate an event data item that is stored in the first data store 102, where the event data item comprises an identity of the mobile communication device, an identity of the cell site, and a timestamp indicating when the origination event occurred. Alternatively, it can be said that it is the mobile communication device that creates this event data in that the mobile communication device initiates the subject event, for example a user of the device selects control inputs on a user interface of the device to originate a phone call or to activate an application for execution on the device that relies on location based services. This event data item can then be analyzed by the traffic analysis application 106 to generate a geolocation data item entry as described above. In some contexts, the geolocation data may be referred to as location fixes of the mobile communication devices. In an embodiment, the geolocation data items are generated by a different application than the traffic analysis application 106 based on analyzing event data items stored in the first data store 102.

The mobile communication devices may be mobile phones, personal digital assistants, smart phones, wearable computers, headset computers, laptop computers, tablet computers, or notebook computers. The work stations 112 may be computers such as desktop computers, laptop computers, tablet computers, notebook computers, or other computers. Computer systems are discussed further hereinafter. While shown as separate data stores, in an embodiment, the first data store 102 and the second data store 110 may be co-located in a single data store, for example stored as different tables in the same data store or as different partitions of the same data store.

The traffic analysis application 106 analyzes the geolocation data items to derive traffic statistics and store these traffic statistics indexed by geohash values in the second data store 110. In some contexts, the traffic statistics may be referred to as a statistical survey of locations of mobile communication devices partitioned by or indexed by geohashes. The workstations 112 can access the derived traffic statistics by indicating an address (e.g., a street address) or a geohash value. For example, the workstations 112 may access an application programming interface (API) or a web application supported by the traffic analysis application 106. The API or web application can receive location identification inputs (e.g., street address or geohash value) from the workstations 112. If the location identification input is a street address, the API or web application can translate this street address to a geohash value. The API or web application then looks up traffic statistics indexed by the geohash value and presents these statistics to the workstations 112 in a user friendly format.

The API or web application may provide traffic statistics for each of a plurality of different geohash formats. For example, when a given street address is provided by a workstation 112, the API or application may determine each of a 7 digit geohash that contains the street address, a 6 digit geohash that contains the street address, and a 5 digit geohash that contains the street address. The API or application may then look up the traffic statistics indexed by the 7 digit geohash, the traffic statistics associated with the 6 digit geohash, the traffic statistics associated with the 5 digit geohash, and present the traffic statistics in a user friendly presentation format on the workstation 112.

Figure 2:
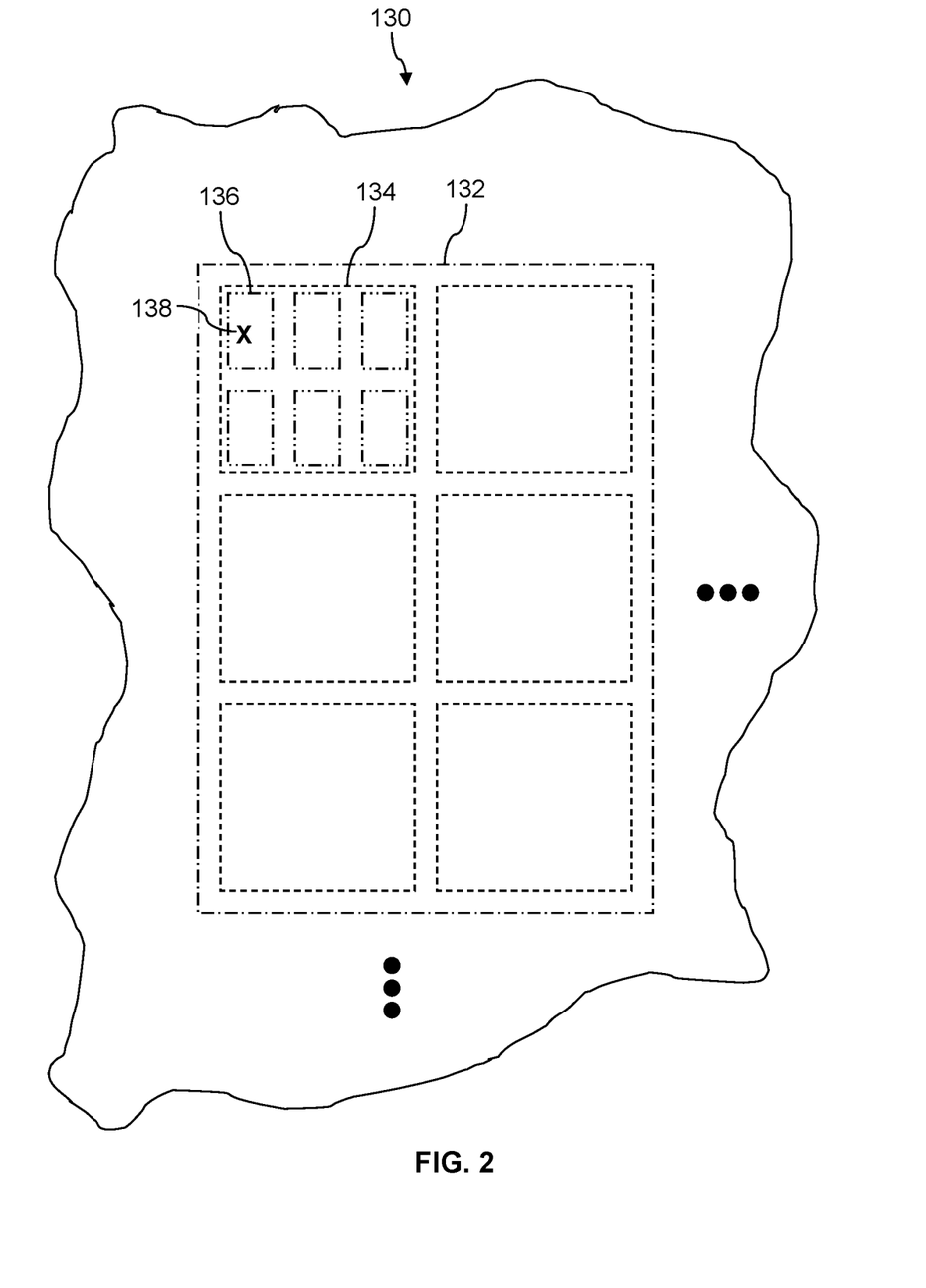
FIG. 2 is an illustration of a geographical region portioned into a plurality of geohashes at different levels of precision according to an embodiment of the disclosure.

Turning now to FIG. 2, a geographical region portioned into a plurality of geohashes at different levels of precision is described. A geographic area 130 may be portioned into a plurality of regions 132, where each region 132 is associated with a geohash value at a first level of precision. Each region 132 may be portioned into a plurality of smaller regions 134, where each region 134 is associated with a geohash value at a second level of precision, where the second level of precision is a higher precision than the first level of precision (e.g., the second level of precision uses geohash values with more digits than the number of digits used to express the geohash value at the first level of precision). Each region 134 in turn can be portioned into a plurality of smaller regions 136, where each region 136 is associated with a geohash value at a third level of precision, where the third level of precision is a higher precision than the second level of precision (e.g., the third level of precision uses geohash values with more digits than the number of digits used to express the geohash value at the second level of precision). As an example, the region 132 may be associated with a five digit geohash, the region 134 may be associated with a six digit geohash, and the region 136 may be associated with a seven digit geohash. An address 138, for example 123 Main Street, Overland Park, Kans., may be coarsely located in the region 132, more precisely located in region 134, and most precisely in region 136.

With reference again to FIG. 1, the traffic analysis application 106 may analyze the geolocation data stored in the first data store 102 on a periodic basis, for example once per week, once every two weeks, once per month, once every 45 days, once every quarter, or on some other periodic basis. The traffic analysis application 106 may analyze the geolocation data in a batch processing mode. The traffic analysis application 106 may analyze the geolocation data at a time that other processing is a low burden on the server 104 and/or during a period of low network 108 utilization, such as at early morning hours. In an embodiment, the traffic analysis application 106 is executed on a computer system that is provided by virtual servers executing in a cloud computing environment, and the traffic analysis application 106 may analyze the geolocation data at a time when cloud computing processing rates are at a minimum, for example at a time when electricity utility rates are at a minimum cost to the cloud computing service provider.

The traffic analysis application 106 may partition the analysis of geolocation data to derive traffic statistics by regional areas. For example, a region corresponding to the area of the United States may be partitioned into 30 sub-regions, and the traffic analysis application 106 may process one of the 30 sub-regions every day so that over the course of a month the geolocation data associated with all 30 sub-regions has been analyzed and traffic statistics derived from that analysis. On the $31^{st}$ day, the traffic analysis application 106 may then analyze the geolocation data associated with the first partition a second time using the geolocation data that has been collected since the previous analysis of the geolocation data associated with the first partition by the traffic analysis application 106.

In an embodiment, the traffic analysis application 106 may preprocess at least some of the geolocation data items before analyzing the geolocation data to derive traffic statistics indexed to geohashes. To increase efficiency of processing by the traffic analysis application 106 and/or the server 104, some of the geolocation data associated with each mobile communication device may selectively be excluded from analysis. This excluded geolocation data may be retained in the first data store 102, but the excluded geolocation is not analyzed by the traffic analysis application 106, thereby reducing the processing load on the traffic analysis application 106 and/or the server 104. It is a teaching of the present disclosure that analyzing geolocation data items in excess of a predefined threshold number of geolocation data items provide little additional insight into traffic patterns of mobile communication devices (and hence the movement patterns of their human users) but does entail additional processing burden, reducing the potential efficiency of the computer system. In some circumstances, that additional processing burden does not increase linearly above the predefined threshold number of geolocation data items but increases exponentially. By selecting geolocation data items prudently, little traffic information is lost.

The preprocessing of geolocation data items to reduce the number of items processed may occur in two stages. The first stage of geolocation data item reduction comprises selectively excluding items that are close to each other both in location and time, on the theory that little information is lost by excluding one of two such similar data items. This may be referred to in some contexts as eliminating location fix duplicates. In an embodiment, the timestamp of a retained geolocation data item associated with an eliminated geolocation data item may be adapted to avoid losing some information pertaining to the eliminated item. For example, if the timestamp of the retained geolocation data item may be changed to the average of the timestamps of the retained and the eliminated geolocation data items. For example, the timestamp of the retained geolocation data item may be given the timestamp of the eliminated geolocation data item.

If the first stage of geolocation data item reduction does not reduce the number of geolocation data items associated with the mobile communication device, a second stage of preprocessing may be performed which randomly eliminated geolocation data items to cull the number of retained geolocation data items to just equal to or just slightly less than the threshold number of items. In an embodiment, the predefined number of geolocation data items is conditioned on the periodic interval of performing the analysis. For example, if the geolocation data items are analyzed once per week, a first predefined number of geolocation data items is used; if the geolocation data items are analyzed once per month, a second larger predefined number of geolocation data items is used. In an embodiment, when geolocation data items are analyzed once per month the predefined threshold number of geolocation data items retained is about 2000 items.

The traffic analysis application 106 processes the retained geolocation data items after the preprocessing described above has been completed to determine counts of geolocation data items within each of the geohashes of a region—a comprehensive region such as the entire United States or for each of a series of sub-regions. Because the interest in knowing the counts of traffic of human beings in geohashes is most often related to determining interaction of the human beings with facilities in the geohashes—visiting a restaurant, being in the vicinity and hence potentially susceptible to eating in a restaurant—the traffic analysis application 106 may not count all geolocation data items associated with a given geohash unless a dwell time threshold is satisfied. For example, if the geolocation data items indicate that a mobile communication device merely transited a geohash, the associated geolocation data is not counted in geohash.

In an embodiment, the dwell time threshold may be about five minutes. In another embodiment, the dwell time threshold may be about ten minutes. In another embodiment, the dwell time threshold may be about fifteen minutes. In an embodiment, the dwell time threshold is adapted by the traffic analysis application 106 based on local conditions. For example, in a region associated with slow commuter traffic (in a major metropolitan area), a higher dwell time threshold may be used than in a region associated with fast commuter traffic. In an embodiment, the dwell time threshold is adapted to a different value throughout a daily cycle, for example to take account of rush hour traffic conditions in the morning and in the late afternoon. In an embodiment, the dwell time threshold may be adapted dynamically based on contextual indications, for example indications of a traffic jam at a specific time in a specific area that might impact commuter traffic dwell times.

In an embodiment, the counts of geolocation data items of a single mobile communication device dwelling in a geohash are determined at a single geohash level of precision in each of a plurality of different sub-regions. For example, in a first sub-region, counts are calculated for 7 digit geohashes only, while in a second sub-region counts are calculated for 5 digit geohashes only. Alternatively, in an embodiment, the counts of geolocation data items of mobile devices dwelling in a geohash are determined at each of a plurality of different geohash levels of precision. For example, the counts of mobile communication devices dwelling longer than the dwell time threshold in a first sub-region (e.g., a primarily dense urban area) are determined at each of a 7 digit geohash level, a 6 digit geohash level, and a 5 digit geohash level. At the same time, the counts of mobile communication devices dwelling longer than the dwell time threshold in a second sub-region (e.g., a primarily rural area) may be determined for different geohash precision levels, for example determined at each of a 6 digit geohash level, a 5 digit geohash level, and a 4 digit geohash level. By determining counts at a plurality of different geohash levels, the needs and interests of different users can be satisfied.

The geolocation statistics can comprise raw counts of devices dwelling in geohashes segmented by hour, by day, by week, or by month. The geolocation statistics can comprise averages of counts of devices over periods of time. The geolocation statistics can attribute the counts per categories associated with the mobile communication device users. For example, the geolocation statistics can attribute the counts and/or analyze the counts of mobile communication devices dwelling in geohashes based on demographics of the users of the devices. For example, the count of devices dwelling in a geohash can be determined by the traffic analysis application 106 as a count of devices associated with users in a first quintile of income, a count of devices associated with users in a second quintile of income, a count of devices associated with users in a third quintile of income, a count of devices associated with users in a fourth quintile of income, and a count of devices associated with users in a fifth quintile of income. The count of devices dwelling in a geohash can be determined by the traffic analysis application 106 as counts of devices associated with five different categories of education. The count of devices dwelling in a geohash can be determined by the traffic analysis application 106 as counts of devices associated with four different categories of age. The count of devices dwelling in a geohash can be determined by the traffic analysis application 106 as counts of devices associated with users assigned to different demographic profiles, where the demographic profiles define different profiles of users as combinations of ranges of demographic properties.

The geolocation statistics can attribute the counts and/or analyze the counts of the mobile communication devices dwelling in geohashes based on behavioral categories of the users of the devices. The behavioral categories can be developed based on information about access by the users to on-line content such as web sites. The behavioral categories can be developed based on information about user buying behavior—frequency of buying, purchase value, types of products purchased.

The counts of devices dwelling in a geohash can be determined by the traffic analysis application 106 as counts of devices that dwell in the geohashes for different dwell times—for example counts of devices that dwell in a geohash more than 5 minutes but less than 10 minutes, counts of devices that dwell in a geohash at least 10 minutes but less than an hour, counts of devices that dwell in a geohash at least an hour but less than 4 hours, counts of devices that dwell in in a geohash at least 4 hours but less than 10 hours, and counts of devices that dwell in a geohash at least 10 hours.

The traffic analysis application 106 can perform analysis of traffic both for recent periods of time and for earlier periods of time for which geolocation data has been determined. For example, if geolocation data is available for a month two years in the past, the traffic analysis application 106 can perform the described analysis of traffic based on that historic information. For example, if a city hosted a Super Bowl two years ago, the traffic analysis application 106 may be able to retrospectively analyze the traffic associated with the month in which the Super Bowl occurred and make this analysis available for comparison to like traffic analysis performed for the month preceding the Super Bowl and the month following the Super Bowl in the selected sub-region.

Figure 3A:
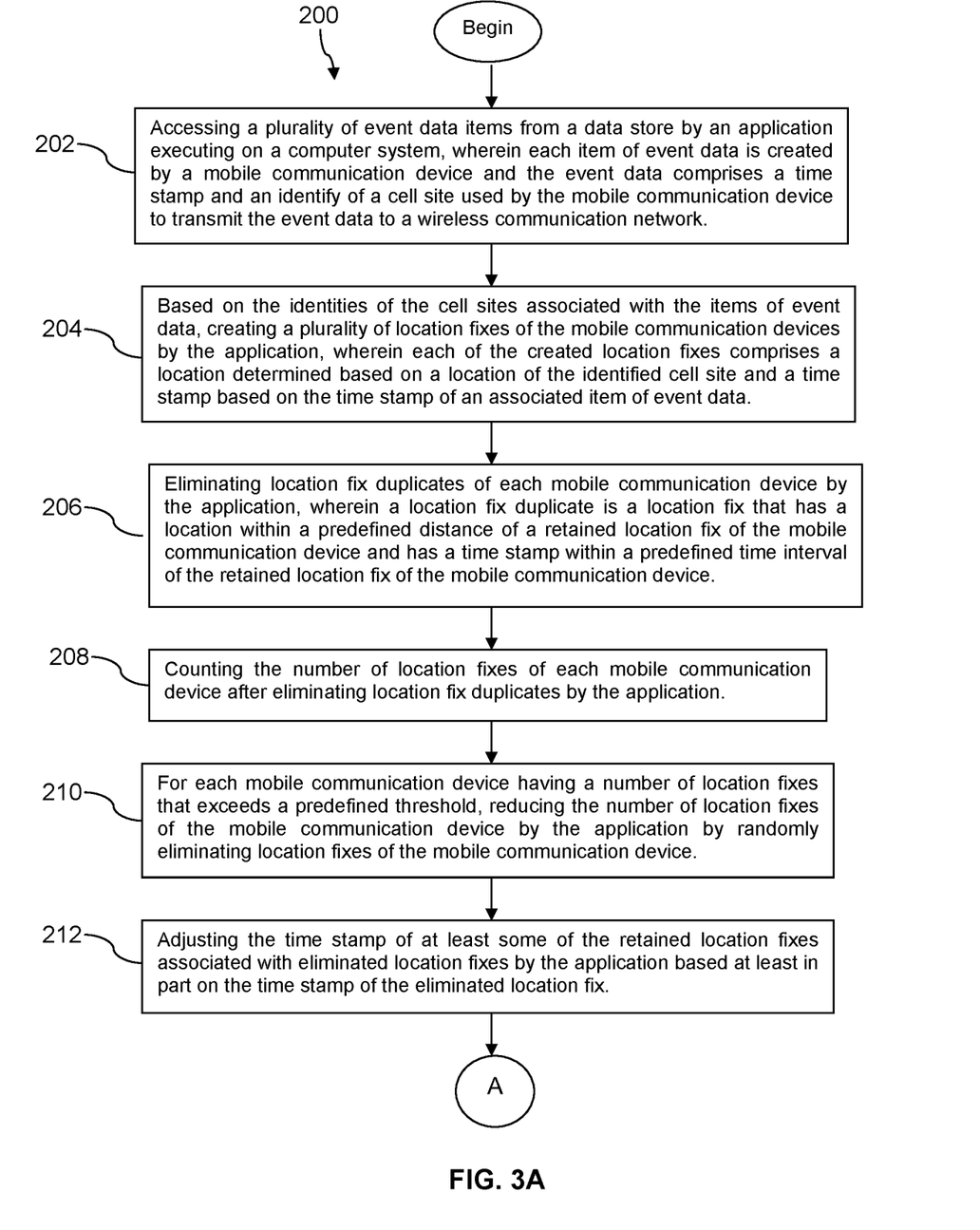
FIG. 3A and FIG. 3B is a flow chart of a method according to an embodiment of the disclosure.
Figure 3B:
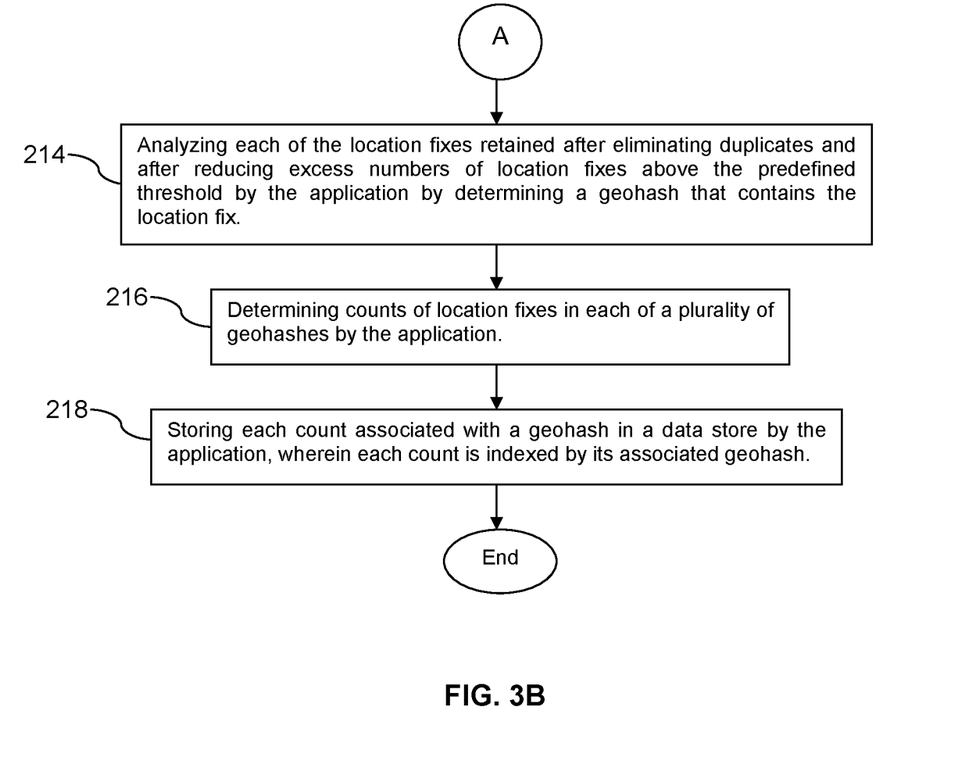

Turning now to FIG. 3A and FIG. 3B, a method 200 is described. In an embodiment, the method 200 is a method of building a statistical survey of locations of mobile communication devices partitioned by geohashes. Such a survey of locations of mobile communication devices can provide valuable information for planning business construction, business promotions, street infrastructure development, and other activities that depend upon knowledge of traffic routes taken by human beings. It is understood that locations of mobile communication devices may be handled as proxies for the locations of their human users, and most often users of mobile communication devices keep these devices close to hand.

At block 202, the method 200 comprises accessing a plurality of event data items from a data store by an application executing on a computer system, wherein each item of event data is created by a mobile communication device and the event data comprises a time stamp and an identity of a cell site used by the mobile communication device to transmit the event data to a wireless communication network. For example, the traffic analysis application 106 executing on the server 104 accesses the first data store 102 to read event data entries. At block 204, the method 200 comprises, based on the identities of the cell sites associated with the items of event data, creating a plurality of location fixes of the mobile communication devices by the application, wherein each of the created location fixes comprises a location determined based on a location of the identified cell site and a time stamp based on the time stamp of an associated item of event data. Alternatively, an application different from the traffic analysis application 106 performs the processing of blocks 202 and 204, and the traffic analysis application 106 only processes the results produced by that other application, for example generates the statistical survey of locations of devices partitioned by geohashes based on analyzing the location fixes of mobile communication devices that it reads from the first data store 102. In some contexts, the location fixes may be referred to as geolocation data items.

At block 206, the method 200 comprises eliminating location fix duplicates of each mobile communication device by the application, wherein a location fix duplicate is a location fix that has a location within a predefined distance of a retained location fix of the mobile communication device and has a time stamp within a predefined time interval of the retained location fix of the mobile communication device. In an embodiment, before eliminating the location fix duplicates the application (e.g., the traffic analysis application 106) may analyze and determine a dwell time of the associated mobile communication device.

At block 208, the method 200 comprises counting the number of location fixes of each mobile communication device after eliminating location fix duplicates by the application. At block 210, the method 200 comprises, for each mobile communication device having a number of location fixes that exceeds a predefined threshold, reducing the number of location fixes of the mobile communication device by the application by randomly eliminating location fixes of the mobile communication device. In an embodiment, the processing of method 200 may be performed about once per month and the predefined threshold number of location fixes may be about 2000. If the method 200 is performed more often or less often than once per month, the predefined threshold number of location fixes may be less than about 2000 or more than about 2000, respectively.

At block 212, the method 200 comprises adjusting the time stamp of at least some of the retained location fixes associated with eliminated location fixes by the application based at least in part on the time stamp of the eliminated location fix. For example, if a location fix is eliminated that is the last location fix of a device in a geohash before it leaves that geohash, the previous location fix of the device in the geohash may have its timestamp changed to be the timestamp of the location fix being eliminated.

At block 214, the method 200 comprises analyzing each of the location fixes retained after eliminating duplicates and after reducing excess numbers of location fixes above the predefined threshold by the application by determining a geohash that contains the location fix. At block 216, the method 200 comprises determining counts of location fixes in each of a plurality of geohashes by the application. In an embodiment, these counts exclude counts of location fixes where the corresponding mobile communication device is determined to not have dwelled in the geohash for a predefined dwell time period. For example, if the geohashes that are analyzed for a given mobile communication device indicate the device did not remain in the geohash for at least 5 minutes, the device is deemed to only have transiently traversed the geohash and is not counted in the aggregate count of devices that have been in the geohash. In different circumstances, this predefined dwell time threshold may be different in different places, for example in a city versus a rural area. Additionally, in an embodiment, the dwell time threshold may be different in the same geohash at different times of day—for example during a rush hour period versus during a time of low highway traffic conditions. In an embodiment, the dwell time threshold may be adapted dynamically based on indications of conditions, for example based on information gleaned from a highway traffic congestion application.

At block 218, the method 200 comprises storing each count associated with a geohash in a data store by the application, wherein each count is indexed by its associated geohash. The method 200 may further comprise developing a variety of different statistical results based on these basic counts. For example, the counts can be distributed according to different time periods and/or different days. The counts can be analyzed to distribute the counts according to demographic categories and/or user behavioral categories.

Figure 4:
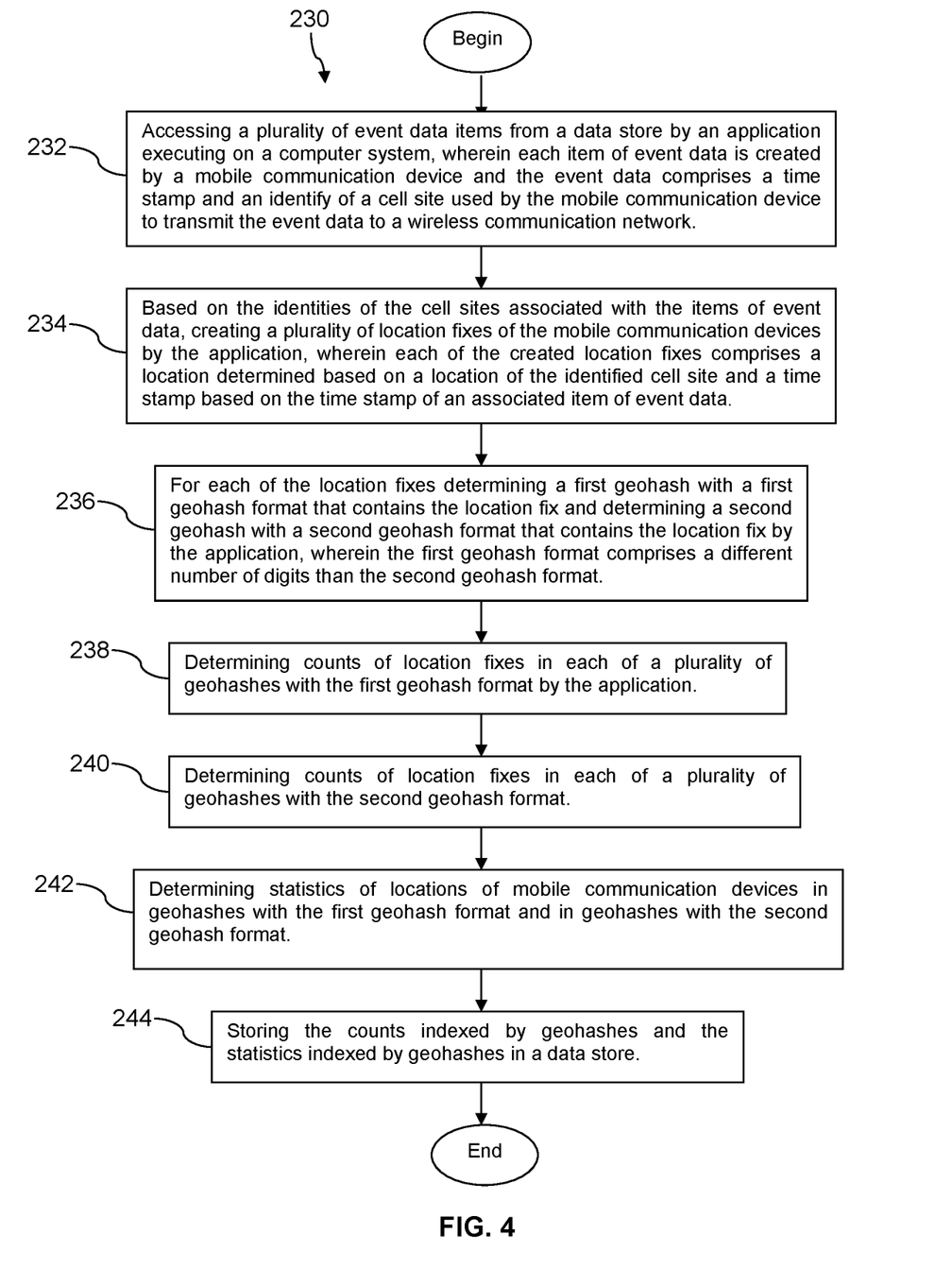
FIG. 4 is a flow chart of another method according to an embodiment of the disclosure.

Turning now to FIG. 4, a method 230 is described. In an embodiment, the method 200 comprises a method of building a statistical survey of locations of mobile communication devices partitioned by geohashes. At block 232, the method 200 comprises accessing a plurality of event data items from a data store by an application executing on a computer system, wherein each item of event data is created by a mobile communication device and the event data comprises a time stamp and an identity of a cell site used by the mobile communication device to transmit the event data to a wireless communication network.

At block 234, the method 200 comprises, based on the identities of the cell sites associated with the items of event data, creating a plurality of location fixes of the mobile communication devices by the application, wherein each of the created location fixes comprises a location determined based on a location of the identified cell site and a time stamp based on the time stamp of an associated item of event data.

At block 236, the method 230 comprises, for each of the location fixes determining a first geohash with a first geohash format that contains the location fix and determining a second geohash with a second geohash format that contains the location fix by the application, wherein the first geohash format comprises a different number of digits than the second geohash format.

At block 238, the method 230 comprises determining counts of location fixes in each of a plurality of geohashes with the first geohash format by the application. At block 240, the method 230 comprises determining counts of location fixes in each of a plurality of geohashes with the second geohash format.

At block 242, the method 230 comprises determining statistics of locations of mobile communication devices in geohashes with the first geohash format and in geohashes with the second geohash format. At block 244, the method 230 comprises storing the counts indexed by geohashes and the statistics indexed by geohashes in a data store.

Figure 5:
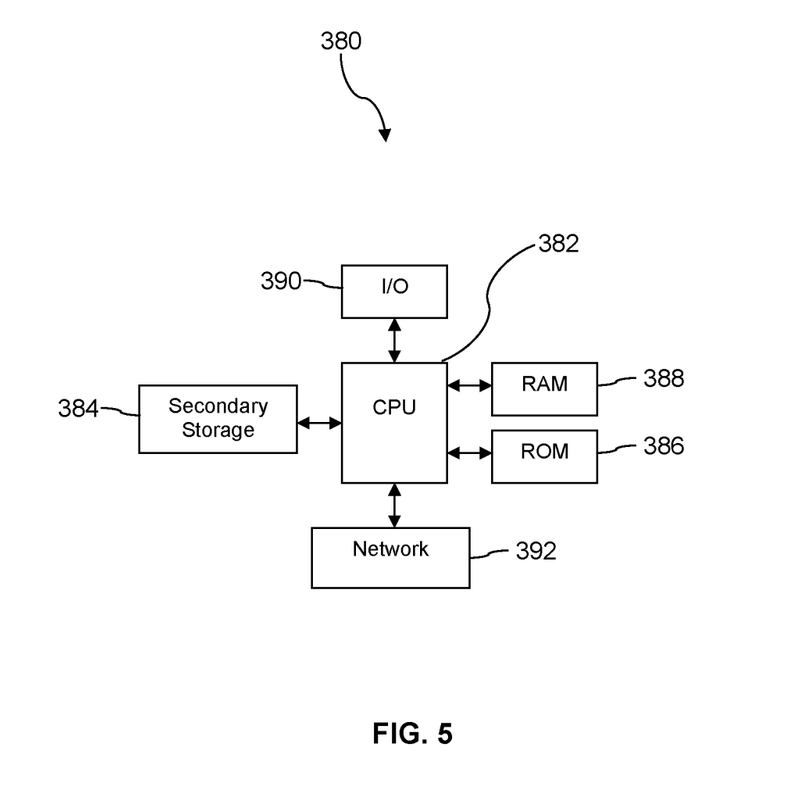
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of building a statistical survey of locations of mobile communication devices partitioned by geohashes, comprising:
    accessing a plurality of event data items from a data store by an application executing on a computer system, wherein each item of event data is created by a mobile communication device and the event data comprises a time stamp and an identity of a cell site used by the mobile communication device to transmit the event data to a wireless communication network;
    based on the identities of the cell sites associated with the items of event data, creating a plurality of location fixes of the mobile communication devices by the application, wherein each of the created location fixes comprises a location determined based on a location of the identified cell site and a time stamp based on the time stamp of an associated item of event data;
    eliminating location fix duplicates of each mobile communication device by the application, wherein a location fix duplicate is a location fix that has a location within a predefined distance of a retained location fix of the mobile communication device and has a time stamp within a predefined time interval of the retained location fix of the mobile communication device;
    counting the number of location fixes of each mobile communication device after eliminating location fix duplicates by the application;
    for each mobile communication device having a number of location fixes that exceeds a predefined threshold, reducing the number of location fixes of the mobile communication device by the application by randomly eliminating location fixes of the mobile communication device;
    adjusting the time stamp of at least some of the retained location fixes associated with eliminated location fixes by the application based at least in part on the time stamp of the eliminated location fix;
    analyzing each of the location fixes retained after eliminating duplicates and after reducing excess numbers of location fixes above the predefined threshold by the application by determining a geohash that contains the location fix;
    determining counts of location fixes in each of a plurality of geohashes by the application; and
    storing each count associated with a geohash in a data store by the application, wherein each count is indexed by its associated geohash.

2. The method of claim 1, wherein the event data items are associated with mobile communication devices comprising a mobile phone, a personal digital assistant, a smart phone, and a wearable computer.

3. The method of claim 1, further comprising looking up locations of cell sites based on cell site identities.

4. The method of claim 1, wherein the predefined threshold number of location fixes is about 2000.

5. The method of claim 1, wherein determining counts of location fixes in each of the plurality of geohashes excludes counting a location fix in a geohash when the mobile communication device associated with the location fix dwells in the geohash less than a predefined dwell time threshold.

6. The method of claim 5, wherein the predefined dwell time threshold is about five minutes.

7. The method of claim 1, wherein determining the counts of location fixes comprises determining the counts of location fixes in each of a plurality geohashes having a first geohash format and determining the counts of location fixes in each of a plurality of geohashes having a second geohash format.

8. A system for building a statistical survey of locations of mobile communication devices partitioned by geohashes, comprising:
    a processor;
    a first data store comprising a plurality of event data entries, wherein each event data entry comprises a time stamp and an identity of a cell site used by a mobile communication device to transmit the event data to a wireless communication network;
    a second data store comprising statistics of locations of mobile communication devices, wherein each entry in the second data store is indexed by a geohash;
    a non-transitory memory; and
    an application stored in the non-transitory memory that, when executed by the processor;
        accesses a plurality of event data entries from the first data store,
        creates a plurality of location fixes of the mobile communication devices associated with the event data entries, wherein each of the created location fixes is created based on the time stamp and the location of the identified cell site contained in one of the event data entries,
        eliminates location fix duplicates of each mobile communication device, wherein a location fix duplicate is a location fix that has a location within a predefined distance of a retained location fix of the mobile communication device and has a time stamp within a predefined time interval of the retained location fix of the mobile communication device,
        for each of the location fixes retained after eliminating duplicates, determines a geohash containing the location associated with the location fix,
        determines statistics of locations of mobile communication devices partitioned by geohash, and
        stores the statistics indexed by geohash in the second data store.

9. The system of claim 8, wherein the application further counts the number of location fixes of each mobile communication device after eliminating duplicates and, for each mobile communication device having a number of location fixes that exceeds a predefined threshold, reducing the number of location fixes of the mobile communication device by randomly eliminating location fixes of the mobile communication device.

10. The system of claim 8, wherein the application determining statistics comprises determining counts of location fixes in each of a plurality of geohashes.

11. The system of claim 8, wherein the application further adjusts the time stamp of at least some of the retained location fixes associated with eliminated location fixes based at least in part on the time stamp of the eliminated location fix.

12. The system of claim 8, wherein the statistics of location of mobile communication devices portioned by geohash comprise a distribution of counts of mobile communication devices based on demographics of users of the mobile communication devices.

13. The system of claim 8, wherein the statistics of location of mobile communication devices portioned by geohash comprise a distribution of counts of mobile communication devices based on behavior of users of the mobile communication devices.

14. The system of claim 8, wherein the application determines statistics of locations of mobile communication devices partitioned by each of a plurality of different geohash formats.

15. The system of claim 14, wherein the application determines statistics of locations of mobile communication devices partitioned by a 7 digit geohash format, a 6 digit geohash format, and a 5 digit geohash format.

16. A method of building a statistical survey of locations of mobile communication devices partitioned by geohashes, comprising:

accessing a plurality of event data items from a data store by an application executing on a computer system, wherein each item of event data is created by a mobile communication device and the event data comprises a time stamp and an identity of a cell site used by the mobile communication device to transmit the event data to a wireless communication network;

based on the identities of the cell sites associated with the items of event data, creating a plurality of location fixes of the mobile communication devices by the application, wherein each of the created location fixes comprises a location determined based on a location of the identified cell site and a time stamp based on the time stamp of an associated item of event data;

for each of the location fixes determining a first geohash with a first geohash format that contains the location fix and determining a second geohash with a second geohash format that contains the location fix by the application, wherein the first geohash format comprises a different number of digits than the second geohash format;

determining counts of location fixes in each of a plurality of geohashes with the first geohash format by the application;

determining counts of location fixes in each of a plurality of geohashes with the second geohash format;

determining statistics of locations of mobile communication devices in geohashes with the first geohash format and in geohashes with the second geohash format; and storing the counts indexed by geohashes and the statistics indexed by geohashes in a data store.

17. The method of claim 16, wherein the first geohash format comprises 7 digit geohashes and the second geohash format comprises 6 digit geohashes.

18. The method of claim 16, wherein the first geohash format comprises 6 digit geohashes and the second geohash format comprises 5 digit geohashes.

19. The method of claim 16, further comprising, for each of the location fixes determining a third geohash with a third geohash format that contains the location fix and determining counts of location fixes in each of a plurality of geohashes with the third geohash format by the application.

20. The method of claim 16, wherein determining counts of location fixes in each of the plurality of geohashes excludes counting location fixes that dwell in the geohash less than a predefined dwell time threshold duration of time.

* * * * *